United States Patent
Huppe et al.

(10) Patent No.: US 10,302,523 B2
(45) Date of Patent: May 28, 2019

(54) METHOD FOR TESTING A SEAL OF A SEALED BEARING CAVITY

(71) Applicant: PRATT & WHITNEY CANADA CORP., Longueuil (CA)

(72) Inventors: Roger Huppe, Chambly (CA); Pierre Yves Legare, Chambly (CA); Alain C. Martel, St-Paul d'Abbotsford (CA); Valeri Soukhostavets, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 135 days.

(21) Appl. No.: 15/167,064

(22) Filed: May 27, 2016

(65) Prior Publication Data

US 2017/0343448 A1 Nov. 30, 2017

(51) Int. Cl.
*G01M 3/32* (2006.01)
*G01M 15/14* (2006.01)
(Continued)

(52) U.S. Cl.
CPC ........ *G01M 3/3281* (2013.01); *G01M 3/2869* (2013.01); *G01M 15/02* (2013.01); *G01M 15/14* (2013.01)

(58) Field of Classification Search
CPC ........ G01M 3/26; G01M 3/04; G01M 3/3236; G01M 3/2876; G01M 3/2853; G01M 3/2861; G01M 3/022; G01M 3/025; G01M 3/3245; G01M 3/32; G01M 3/329; G01M 3/36; G01M 3/363; G01M 3/3281; G01M 15/14; F01D 21/003; F01D 17/02; F01D 25/16; F01D 25/18; F01D 25/183;
(Continued)

(56) References Cited

U.S. PATENT DOCUMENTS 6,082,184 A * 7/2000 Lehmann ............ G01M 3/3281
                                                          73/49.3
6,799,452 B2   10/2004 Brunet et al.
(Continued)

FOREIGN PATENT DOCUMENTS

EP         2333290         6/2011

OTHER PUBLICATIONS (English Translation) Guangcun Gu, Sealed Bearing Air Tightness Detection Device, Mar. 2015, C & U Group Ltd, pp. 1-14.*

*Primary Examiner* — John Fitzgerald
*Assistant Examiner* — Truong D Phan
(74) *Attorney, Agent, or Firm* — Norton Rose Fulbright Canada LLP

(57) ABSTRACT

The method for testing the integrity of a seal of a cavity in an engine includes providing a sealed test tank external to the cavity, the test tank having an internal volume that is particularly selected, as described herein. A pressure differential is generated between the test tank and the cavity, by creating an initial test pressure within the test tank that is different than an ambient pressure inside the cavity. Gas flow between the test tank and the cavity is then permitted, and a change in pressure within the test tank is measured, as is a test time required for the pressure inside the test tank to reach a reference pressure. The measured test time is compared with a predetermined reference time, and the integrity of the seal may be confirmed when the test time is greater than or equal to the reference time.

18 Claims, 3 Drawing Sheets

(51) Int. Cl.
*G01M 3/28* (2006.01)
*G01M 15/02* (2006.01)

(58) Field of Classification Search
CPC ........ F01D 25/20; F01D 11/06; F01D 29/124; F05B 2260/80
USPC ................. 73/46, 49.7, 49.8, 40, 49.2, 49.3; 415/118
See application file for complete search history.

(56) References Cited

U.S. PATENT DOCUMENTS

| | | | |
|---|---|---|---|
| 6,817,228 | B2 | 11/2004 | Upton et al. |
| 7,137,590 | B2 | 11/2006 | Sandrart et al. |
| 9,695,709 | B2 * | 7/2017 | Parnin .................... F01D 25/18 |
| 2002/0100314 | A1 * | 8/2002 | Docy .................... G01M 3/007 73/49.2 |
| 2004/0016290 | A1 * | 1/2004 | Poblete ............... G01M 3/2869 73/46 |
| 2006/0239816 | A1 * | 10/2006 | Labbe .................. F01D 11/003 415/230 |
| 2007/0079625 | A1 * | 4/2007 | Pippia ................. B67D 1/0462 62/336 |
| 2008/0264084 | A1 * | 10/2008 | Derouineau ........... B64D 13/06 62/172 |
| 2013/0280043 | A1 | 10/2013 | Parnin et al. |
| 2014/0250981 | A1 | 9/2014 | Overby et al. |
| 2016/0238480 | A1 * | 8/2016 | Socha .................. G01M 3/025 |
| 2017/0205307 | A1 * | 7/2017 | Hogreve ................ G01M 3/04 |

* cited by examiner

METHOD FOR TESTING A SEAL OF A SEALED BEARING CAVITY

TECHNICAL FIELD

The disclosure relates generally to a method of evaluating the integrity of a seal of gas turbine engines and, more particularly, to a method for testing a seal of a sealed bearing cavity of gas turbine engines.

BACKGROUND

Bearing cavities of gas turbine engines are normally pressurized with air and sealed to prevent leakage of lubricating oil from the bearing cavities. Determining acceptable air leakages through the seals is one of the design parameters of the bearing cavities. The integrity of a seal is confirmed when air leakage therethrough is below the acceptable design parameter of air leakage. Integrity tests can be required during or after engine assembly in order to evaluate the bearing seals.

Known methods for testing seals are normally used for cases of relatively small air leakages through the seals or for relatively large volumes of tested cavities. However, the bearing cavities of gas turbine engines may have relatively small volumes while permitting relatively large acceptable air leakages through the seals. Therefore, an improved method of testing seals in a sealed bearing cavity is desirable.

SUMMARY

There is accordingly provided a method for testing the sealing integrity of at least one seal of a cavity in an engine, the cavity and surroundings being at ambient pressure prior to testing, the method comprising: providing a sealed test tank external to the cavity and ensuring that the cavity is sealed with the exception of the at least one seal; generating a pressure differential between the test tank and the cavity by creating an initial test pressure within the test tank that is different than the ambient pressure; fluidly connecting the test tank and the cavity to initiate pressure balancing between the test tank and the cavity, thereby permitting ambient gas flow through the at least one seal either into or out of the cavity; measuring a change in pressure within the test tank and a test time required for the pressure inside the test tank to reach a reference pressure, the reference pressure being a preselected pressure between the initial test pressure and the ambient pressure; and comparing the test time with a predetermined reference time, wherein the at least one seal has a desired sealing integrity when the test time is greater than or equal to the reference time.

There is also provided a method of determining integrity testing conditions for a seal of a sealed cavity in an engine, the method comprising: determining a leakage area of the seal, the ambient temperature and ambient pressure within the cavity, and a gas constant of a gas to be used for testing the seal; determining a characteristic volume of an external test tank for testing the integrity of the seal, wherein the characteristic volume is defined by $V^* = A_{leak} \cdot \sqrt{T_{amb} R_{gas}} \cdot \delta_{time}$, wherein $\delta_{time}$ is a time measurement accuracy coefficient, $T_{amb}$ is the ambient temperature within the cavity, $R_{gas}$ is the gas constant, and $A_{leak}$ is the leakage area of the seal; selecting an internal volume (V) of the external test tank using the characteristic volume; selecting an initial test pressure within the test tank that is different from the ambient pressure within the cavity; selecting a reference pressure that is between the initial test pressure and the ambient pressure within the cavity; and determining a reference time, against which to compare measured test times, by calculating or measuring a time required for the test tank having the selected internal volume to go from the initial test pressure to the reference pressure when the test tank is fluidly connected to the cavity sealed by one or more reference seals.

There may be further provided an apparatus for testing the integrity of a seal of a cavity in a gas turbine engine, the apparatus comprising: a differential pressure source for providing positive or negative gauge pressures; a test tank fluidly connectable to the differential pressure source and the cavity, the test tank having an internal volume defined by $V = (V^*) \cdot (Rv)$, wherein V is the internal volume, $V^*$ is a characteristic ratio defined by $V^* = A_{leak} \cdot \sqrt{T_{amb} R_{gas}} \cdot \delta_{time}$, $\delta_{time}$ is a time measurement accuracy coefficient, $T_{amb}$ is an ambient temperature within the cavity, $R_{gas}$ is a gas constant, $A_{leak}$ is a leakage area of the seal, and $Rv$ is a volume ratio between 10 and 53; and a pressure gauge connected to the internal volume.

BRIEF DESCRIPTION OF THE DRAWINGS

Reference is now made to the accompanying figures in which.

DETAILED DESCRIPTION

Figure 1:
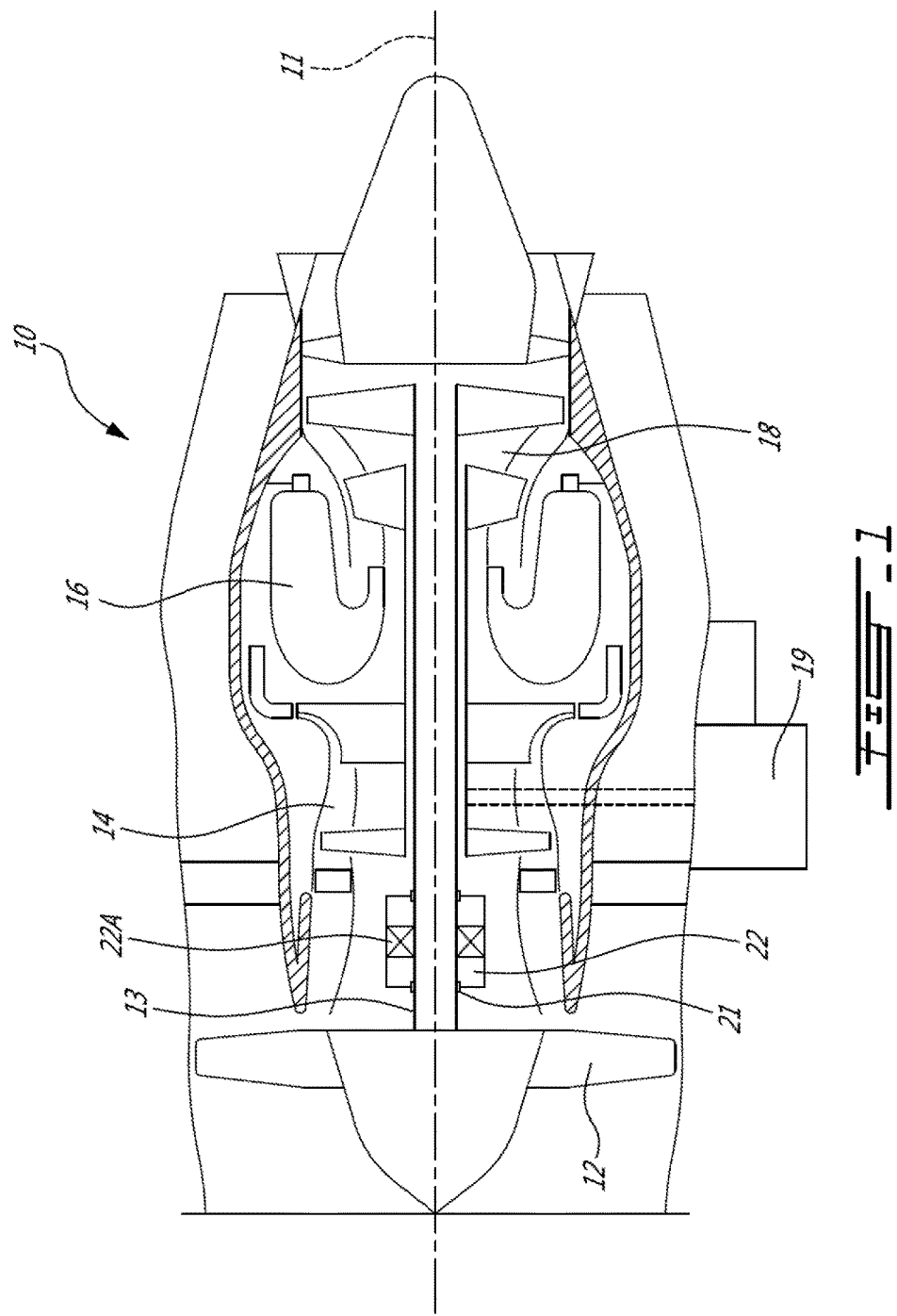
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 also includes a number of bearings 22A, for example bearings 22A which support one or more main engine shafts 13. The bearings 22A are housed within bearing cavities 22. Fluids, such as oil for example, are commonly provided to lubricate and cool such bearings 22A. Seals 21 are thus required to seal the bearing cavities 22. The seals can be of the type known as contact seals as well as the type known as non-contact seals. As stated above, it is desirable to be able to test the integrity of such bearing cavity seals 21.

Figure 2:
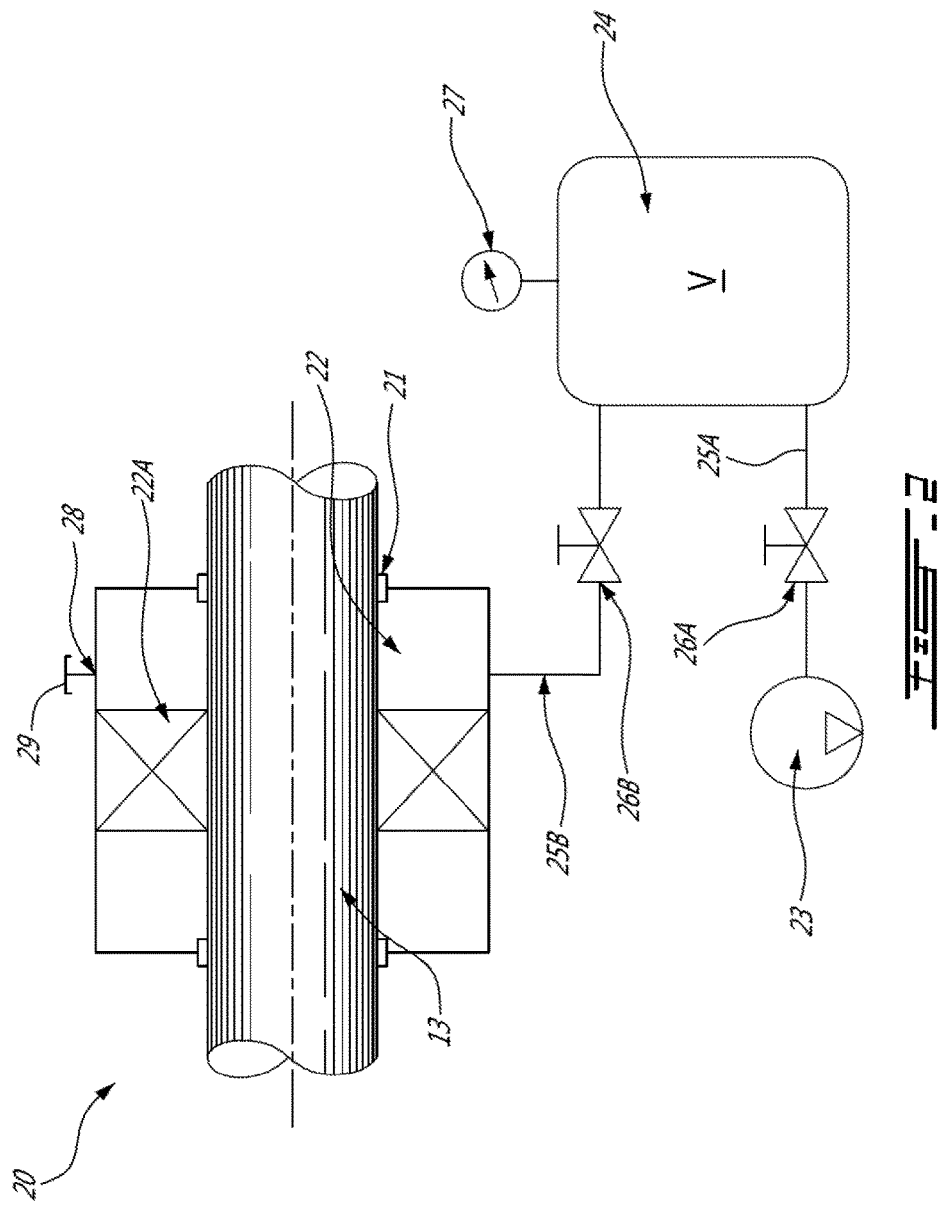
FIG. 2 is a schematic view of a system for testing a seal of a sealed bearing cavity in accordance with an embodiment of the present disclosure.

Referring to FIG. 2, a system 20 is shown for testing the integrity of a seal 21 of a sealed bearing cavity 22 having a bearing 22A around a shaft 22B. The system 20 includes a differential pressure source 23 for providing either a positive pressure a or negative gauge pressure (i.e. a vacuum), for example through pressurized air or suction, to the system 20. In the embodiment shown, the pressure source 23 is a vacuum pump which generates a vacuum (i.e. negative gauge pressure). In the embodiment shown, the test is performed under ambient temperature, and therefore the pressure within and surrounding the cavity 22, prior to the testing, is ambient pressure.

The system 20 also includes an additional or test tank 24 which is external to the bearing cavity 22 and is removably connected in fluid communication with cavity, such as to enable pressure balancing between the test tank 24 and the cavity 22. When so connected, therefore, air (at ambient pressure) from outside the cavity 22 is able to be drawn into the cavity through the seal(s) 21 when the cavity 22 is put under vacuum. Alternately, if the cavity is instead pressurized, the ambient air within the cavity is forced out of the cavity 22 via the seal(s) 21. Because all other openings to the cavity 22 (i.e. with the exception of the seals) are otherwise blocked or sealed prior to fluidly connecting the test tank and the cavity, the amount of air which is able to enter or leave the cavity 22 via the seal(s) 21, when the cavity is put under vacuum or pressurized, and thus the time it takes for the pressures to balance, will vary depending on the integrity of the seal. Thus the integrity of the seals can be evaluated as described further below.

This external test tank 24 (together with its associated connection pipes 25B) has a combined internal volume V, which in at least one embodiment is larger than an internal volume of the cavity 22. While the expression "internal volume of the test tank" will be used herein, it is understood that this volume includes both the actual internal volume of the tank itself as well as any additional volume of the corresponding piping or other fluid connections fluidly connecting the external test tank 24 to the cavity that it is testing. The test tank 24 refers to a container capable of being pressurized and/or vacuumed for providing pressure and/or vacuum sources. The test tank 24 is fluidly connected to the differential pressure source 23 and the bearing cavity 22 via a conduits or ducts 25, such as pipes for example, to allow a flow of gas, such as air, between the test tank 24, the differential pressure source 23 and the bearing cavity 22. A first valve 26A is disposed along a first conduit or duct 25A between the differential pressure source 23 and the test tank 24, and a second valve 26B is disposed along a second conduit or duct 25B between the test tank 24 and the bearing cavity 22 to selectively block the flow of gas within the ducts 25. The valves 26A and 26B are separately actuable to open and close, to thereby block or permit gas flow through the respective conduit 25A and 25B.

The internal volume V of the test tank 24 is chosen from a range of a volume ratio Rv to provide a reasonable testing time to perform the test of the seal 21 and a reasonable internal volume of the test tank 24. "Reasonable" in these regards is understood to mean practical for carrying out tests on bearing cavities of gas turbine engines, as will be understood by one skilled in the art, whether the engine be in situ within an aircraft or fully and/or partially assembled but not yet installed on an aircraft.

The selection of the volume ratio for the test can affect the accuracy of the test time measurements and test time durations. Higher volume ratios may result in larger internal volume and longer testing times making the test more expensive to perform and lower volume ratios may result in short testing times and rapid pressure changes making the test unreliable. For instance, selection of the volume ratio below ten (10) can result in a test time $T_{time}$ duration of ten (10) seconds and may not guarantee a reliable evaluation of the integrity of the seal 21 due to high rate of pressure rise over time. On the other hand, selection of the volume ratio above 53 can result in longer test time $T_{time}$ durations and an excessively large internal volume V of the test tank 24. A long test duration $T_{time}$ and large test tank 24 can increase the cost of testing the seal 21.

The volume ratio Rv is defined as the internal volume V of the test tank 24 over a characteristic volume V*(V/V*), where the characteristic volume V* is defined by:

$$V^* = A_{leak} \cdot \sqrt{T_{amb} R_{gas}} \cdot \delta_{time} \qquad (1),$$

Where:
$\delta_{time}$ is a time measurement accuracy value which depends on systematic errors and random errors of time measurement equipment used during the test;
$T_{amb}$ is an ambient temperature during the test;
$R_{gas}$ is a gas constant; and
$A_{leak}$ is a leakage area of the seal.

The range of the volume ratio used in testing the integrity of the seal 21 in the bearing cavity 22 of the engine 10 is, in at least one particular embodiment, between 10 and 53, in order to provide reasonable testing times and reliable results. The characteristic volume represents an estimation of the volume of gas passing through the leakage area of the seal 21 at ambient temperature in the period of time equal to the time measurement error. As shown in equation (1) above, the characteristic volume V* depends on the characteristics of the seal 21 and testing conditions via the leakage area for example, ambient conditions and time measurement accuracies. In use, once the characteristic volume V* is determined, a ratio can be selected from the range of volume ratio to determine the internal volume V of the test tank 24. The systematic errors of the time measurement, as quantified by the time measurement accuracy value, is a positive time required to balance pressures between the cavity 22 and the test tank 24 after opening the second valve 26B between the test tank 24 and the cavity 22. Based on computer modeling analysis, for the range of volume ratio, the systematic errors are of the order of 1 second. The random errors for most commonly used time measurement devices is very small in comparison with systematic errors, and can therefore be neglected.

The system 20 may also include a pressure measurement unit 27 connected to test tank 24 for measuring the pressure inside the test tank 24.

One or more openings 28 in the cavity 22 may exist during normal operation of the engine, such as oil feeding lines, etc. which are connected to bearing cavities, for example. During the testing of the cavity 22, however, these openings 28 are closed off, such as by caps, plugs, or one or more valves 29, for example. The testing of the cavity 22, and thus of the seal(s) 21 therein, may thus be conducted with only ambient pressure through the seal(s) 21.

According to a particular embodiment there is provided a method for testing the integrity of the seal 21 sealing the cavity 22. The method compares between measured times for the pressure inside the test tank 24 to reach a reference pressure using the test seal 21 and an unimpaired reference seal to confirm the integrity of the test seal 21. The method includes providing the test tank 24 external to the cavity 22 and providing an initial test pressure inside the test tank 24, the initial test pressure value is diffident than an ambient pressure within and surrounding the cavity, such as to allow the flow of gas therebetween.

The method also includes providing the reference time, the reference time is the time required for the initial test pressure inside the test tank 24 to reach the reference pressure using the unimpaired reference seal in a reference test following a reference test method, the reference pressure is different than the initial test pressure and selected as a ratio of the reference pressure to the ambient pressure of between 0.6 and 1.4. Values between 0.6 and 0.99 are used for vacuum testing and values between 1.01 and 1.4 are used for pressure testing. For pressure testing, the initial test pressure is higher than the reference pressure and for vacuum testing, the initial test pressure is lower than the reference pressure.

Once the initial test pressure is reached inside the test tank 24, the method includes fluidly connecting the test tank 24 to the cavity 22 to allow the flow of gas between the cavity 22 and the test tank 24.

The method also includes measuring a test time required for the initial test pressure inside the test tank 24 to reach the reference pressure and comparing the test time with the reference time. The integrity of the seal 21 may thus be evaluated and confirmed if the measured test time is greater than, or equal to, the reference time. The integrity of the seal means that the seal 21 has passed the test and can be used on the engine 10 for sealing the bearing cavity 22. In an alternative embodiment, testing the unimpaired reference seal can be carried out by a computerized analysis, for example via Computational Fluid Analysis (CFA) to calculate the reference time.

Figure 3:
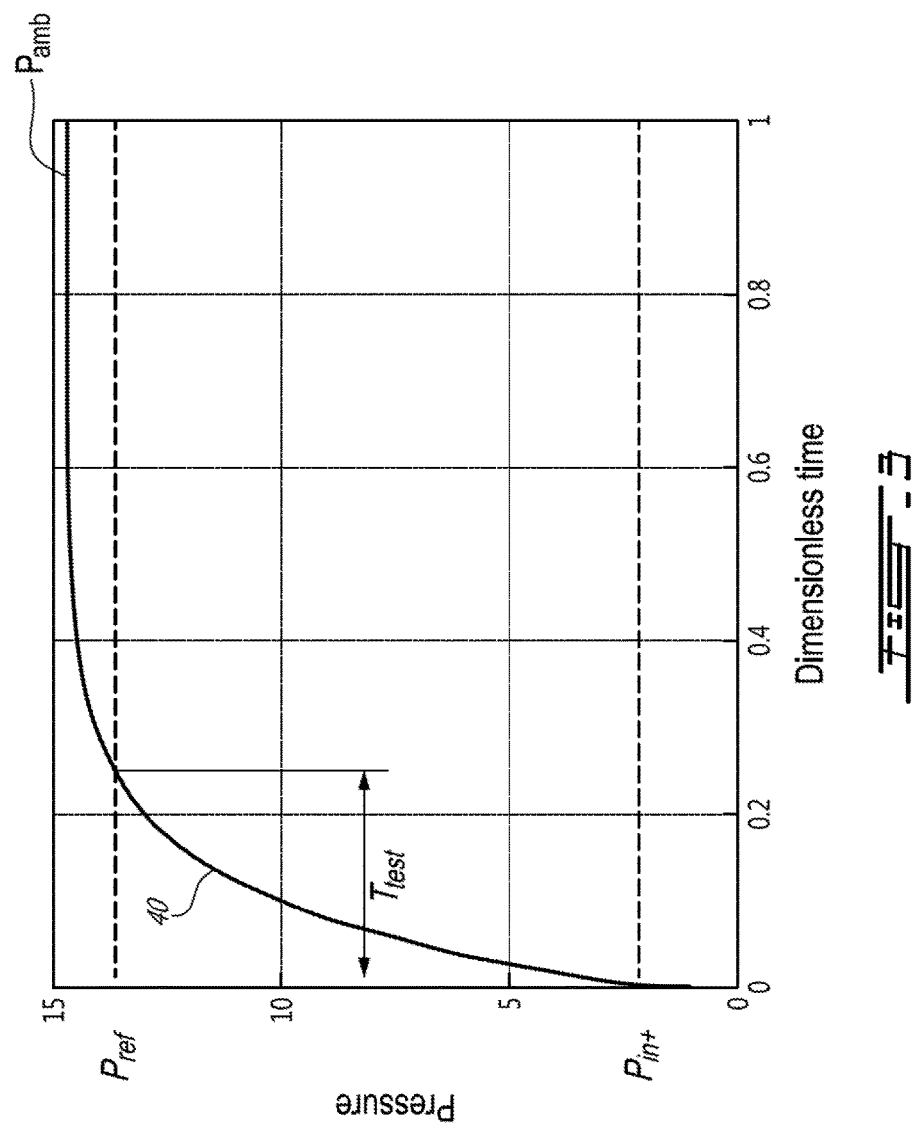
FIG. 3 is a graph showing a pressure curve of pressure versus time in accordance with an embodiment of the present disclosure.

In an alternative embodiment, pressure curves are used to evaluate the integrity of the seal 21. For example, pressure curves can be generated for every type of seal 21. Referring to FIG. 3, a pressure curve 40 of pressure inside the test tank 24 versus time is shown. The pressure curve 40 is predetermined using an appropriate method, such as by computer modeling or test results for reference seals. These reference seals may be non-damaged seals and/or seals for which the integrity is known to be good. In the embodiment shown, the pressure inside the test tank 24 varies from an initial pressure (Pint) toward ambient pressure (Pamb) over time, after the pressure between the test tank and the cavity is allowed to become balanced by permitting gas flow communication therebetween. This may be done, for example, by generating a vacuum (or positive pressure) within the test tank, closing the valve 25A, opening the valve 26B and thereby balancing the pressures in the test tank 24 and the cavity 22. The test time (Ttest) is determined once the pressure curve 40 intersects the selected reference pressure (Pref) line 41. Beyond the intersection, the pressure curve 40 approaches asymptotically the ambient pressure Pamb. The ambient pressure Pamb can be defined as the pressure surrounding the system 20.

The following examples are provided as an illustration for determining the internal volume of the test tank 24 in accordance to a particular embodiment under room temperature and volume ratio between 10 and 53 in order to provide the reasonable testing time and reliable results. The leakage areas $A_{leak}$ for typical gas turbine engines seals can range between about 0.001 in$^2$ and about 0.1 in$^2$.

For $A_{leak}$=0.001 in$^2$, the characteristic volume is V*=11.4 in$^3$, providing a tank volume (V) (i.e. volume of the tank itself and volume of any connected piping) of 114 in$^3$ (about 2 L) when using a volume ratio of 10, and an internal tank volume of 604 in$^3$ (about 10 L) when using a volume ratio of 53.

For $A_{leak}$=0.1 in$^2$, the characteristic volume is V*=1140 in$^3$, providing an internal tank volume (V) (i.e. volume of the tank itself and volume of any connected piping) of 11400 in$^3$ (about 200 L) when using a volume ratio of 10, and an internal tank volume of 60420 in$^3$ (about 1000 L) when using a volume ratio of 53.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for testing sealing integrity of at least one seal of a cavity in an engine, the cavity and surroundings thereto being at ambient pressure prior to testing, the method comprising:
   a) providing a sealed test tank external to the cavity, ensuring that the cavity is sealed with exception of the at least one seal, and preventing fluid flow between the sealed test tank and the cavity, the test tank having an internal volume defined according to V=(V*)·(Rv), wherein V is the internal volume of the test tank, Rv is a predetermined volume ratio and V* is a characteristic volume defined by $V^*=A_{leak}\cdot\sqrt{T_{amb}R_{gas}}\cdot\delta_{time}$, time where $\delta_{time}$ is a time measurement accuracy coefficient, $T_{amb}$ is an ambient temperature within the cavity, $R_{gas}$ is a gas constant, $A_{leak}$ is a leakage area of the seal;
   b) generating a pressure differential between the test tank and the cavity by creating an initial test pressure within the test tank that is different from the ambient pressure within the cavity;
   c) after reaching the initial test pressure, releasing fluid flow from the test tank to the cavity to initiate pressure balancing between the test tank and the cavity, thereby permitting ambient gas flow through the at least one seal either into or out of the cavity;
   d) measuring a change in pressure within the test tank and a test time required for pressure inside the test tank to reach a reference pressure, the reference pressure being a preselected pressure between the initial test pressure and the ambient pressure; and
   e) comparing the test time with a predetermined reference time, wherein the at least one seal has a desired sealing integrity when the test time is greater than or equal to the reference time.

2. The method of claim 1, further comprising selecting the reference pressure to provide a ratio of the reference pressure to the ambient pressure of between 0.6 and 1.4.

3. The method of claim 1, further comprising selecting the initial test pressure within the test tank to be negative gauge pressure relative to the ambient pressure.

4. The method of claim 1, further comprising selecting the internal volume of the test tank to be larger than an internal volume of the cavity.

5. The method of claim 2, further comprising selecting the volume ratio to be between 10 and 53.

6. The method of claim 1, wherein the step of generating the pressure differential further comprises creating a vacuum within the test tank, the initial test pressure being negative gauge pressure and the reference pressure being greater than the initial test pressure within the test tank and less than the ambient pressure of the cavity.

7. The method of claim 6, further comprising selecting the reference pressure to provide a ratio of the reference pressure to the ambient pressure of between 0.6 and 1.0.

8. The method of claim 1, wherein the step of generating the pressure differential further comprises creating a positive pressure within the cavity, the ambient pressure being positive pressure and the reference pressure being less than the initial test pressure within the test tank and greater than the ambient pressure of the cavity.

9. The method of claim 8, further comprising selecting the reference pressure to provide a ratio of the reference pressure to the ambient pressure of between 1.0 and 1.4.

10. The method of claim 1, wherein the cavity is a bearing cavity of a gas turbine engine and the test tank is external to the gas turbine engine, the step of permitting gas flow further comprising connecting the test tank and the bearing cavity of the gas turbine engine in gas flow communication.

11. The method of claim 10, further comprising providing a valve in line between the test tank and the bearing cavity, the valve being actuable between open and closed positions to respective allow and block gas flow between the test tank and the bearing cavity.

12. The method of claim 1, wherein the step of creating the initial test pressure within the test tank further comprises connecting the test tank and a differential pressure source together in gas flow communication, using the differential pressure source to generate the initial test pressure within the test tank and sealing the test tank.

13. The method of claim 12, further comprising, after using the differential pressure source to generate the initial test pressure within the test tank, disconnecting the differential pressure source from the test tank.

14. A method of determining integrity testing conditions for a seal of a sealed cavity in an engine, the method comprising:
   a) determining a leakage area of the seal, the ambient temperature and ambient pressure within the cavity, and a gas constant of a gas to be used for testing the seal;
   b) determining a characteristic volume of an external test tank for testing the integrity of the seal, wherein the characteristic volume is defined by $V^* = A_{leak} \cdot \sqrt{T_{amb} R_{gas}} \cdot \delta_{time}$, wherein $\delta_{time}$ is a time measurement accuracy coefficient, $T_{amb}$ is the ambient temperature within the cavity, $R_{gas}$ is the gas constant, and $A_{leak}$ is the leakage area of the seal;
   c) selecting an internal volume (V) of the external test tank using the characteristic volume;
   d) selecting an initial test pressure within the test tank that is different from the ambient pressure within the cavity;
   e) selecting a reference pressure that is between the initial test pressure and the ambient pressure within the cavity; and
   f) determining a reference time, against which to compare measured test times, by calculating or measuring a time required for the test tank having the selected internal volume to go from the initial test pressure to the reference pressure when the test tank is fluidly connected to the cavity sealed by one or more reference seals.

15. The method of claim 14, wherein the step of selecting the internal volume of the external test tank further comprises selecting a volume ratio (Rv) of between 10 and 53, and multiplying the volume ratio by the characteristic volume.

16. The method of claim 14, further comprising selecting the reference pressure to provide a ratio of the reference pressure to the ambient pressure of between 0.6 and 1.4.

17. The method of claim 14, further comprising selecting the internal volume of the test tank to be larger than an internal volume of the cavity.

18. The method of claim 14, further comprising selecting the initial test pressure within the test tank to be a negative gauge pressure generated by a vacuum, and selecting the reference pressure to be greater than the initial test pressure within the test tank and less than the ambient pressure of the cavity.

* * * * *